(12) United States Patent
Franz et al.

(10) Patent No.: US 7,545,506 B2
(45) Date of Patent: Jun. 9, 2009

(54) INTERFEROMETRIC MEASURING DEVICE

(75) Inventors: Stefan Franz, Jena (DE); Matthias Fleischer, Ostfildern (DE)

(73) Assignee: Robert Bosch GmbH, Stuttgart (DE)

(*) Notice: Subject to any disclaimer, the term of this patent is extended or adjusted under 35 U.S.C. 154(b) by 326 days.

(21) Appl. No.: 11/652,942

(22) Filed: Jan. 11, 2007

(65) Prior Publication Data
US 2007/0268584 A1    Nov. 22, 2007

(30) Foreign Application Priority Data
Jan. 13, 2006    (DE) ................. 10 2006 001 732

(51) Int. Cl.
*G01B 11/02* (2006.01)
(52) U.S. Cl. ................... 356/498; 356/497
(58) Field of Classification Search ............. 356/450, 356/498, 479, 497, 482, 486, 487, 500, 492
See application file for complete search history.

(56) References Cited

U.S. PATENT DOCUMENTS

| | | | | |
|---|---|---|---|---|
| 4,385,835 A * | 5/1983 | Westerberg | .................. | 356/498 |
| 4,870,635 A * | 9/1989 | Block et al. | .................. | 720/659 |
| 5,402,230 A * | 3/1995 | Tian et al. | .................... | 356/482 |
| 5,585,922 A * | 12/1996 | Sueyoshi | .................... | 356/487 |
| 6,008,902 A * | 12/1999 | Rinn | .......................... | 356/486 |
| 6,943,894 B2 * | 9/2005 | Kitahara | ..................... | 356/487 |
| 2002/0109849 A1 * | 8/2002 | Kitahara et al. | ............. | 356/486 |
| 2004/0036887 A1 * | 2/2004 | Kitahara | ..................... | 356/486 |

FOREIGN PATENT DOCUMENTS

| | | |
|---|---|---|
| DE | 198 08 273 | 9/1999 |
| DE | 102 44 553 | 2/2004 |

* cited by examiner

*Primary Examiner*—Patrick J Connolly
(74) *Attorney, Agent, or Firm*—Kenyon & Kenyon LLP

(57) ABSTRACT

The present invention relates to an interferometric measuring device having a short-coherent radiation source, a modulation interferometer and a downstream reference interferometer connected thereto. The mechanical coupling between the reference interferometer and the modulation interferometer is provided with a backlash. For equalizing an optical path difference in the interferometric measuring device, an optical path difference established in the modulation interferometer is reset in the reference interferometer. The optical path differences between the partial beams in the modulation interferometer and between the partial beams in the reference interferometer may be changed via optical components mechanically coupled with the aid of a backlash, the movable optical component of the reference interferometer following a movement of the movable optical component of the modulation interferometer after passing a backlash distance in the backlash.

17 Claims, 2 Drawing Sheets

INTERFEROMETRIC MEASURING DEVICE

BACKGROUND OF THE INVENTION

1. Field of the Invention

The present invention relates to an interferometric measuring device having a short-coherent radiation source and a system of a modulation interferometer and a downstream reference interferometer coupled thereto.

2. Description of Related Art

A conventional interferometric measuring device is described in published German patent document DE 102 44 553, which discloses an interferometric measuring device for detecting the shape, the roughness, or the distance of the surface of a measured object using a modulation interferometer, to which short-coherent radiation is supplied by a radiation source and which has a first beam splitter for splitting the supplied radiation into a first partial beam conducted via a first arm and a second partial beam conducted via a second arm, the light phase or light frequency of one of the partial beams being shifted with respect to the other by a modulation device and this beam passing through a delay segment, the two partial beams being subsequently combined in a further beam splitter of the modulation interferometer, having a measuring probe spatially separated from the modulation interferometer and connected or connectable thereto via a fiber optic device in which the combined partial beams are split into a measuring beam conducted to the surface by a probe fiber optic device having an oblique object-side exit surface and a reference beam and in which the measuring beam ($r_1(t)$) reflected on the surface and the reference beam ($r_2(t)$) reflected on a reference plane are superimposed, and having a receiving device and an analyzing unit for converting the radiation supplied thereto into electric signals and for analyzing the signals on the basis of a phase difference. The angle of inclination (y) of the exit surface is at least 46° with respect to the normal to the optical probe axis.

Published German patent document DE 198 08 273 also describes such an interferometric measuring device for detecting the shape or distance, in particular of rough surfaces, having at least one spatially coherent beam generating unit whose radiation is split, in a measuring probe, into a measuring reference beam conducted through a measuring reference branch and reflected therein and a measuring beam reflected on the rough surface, having a device for modulating the light phase or for shifting the light frequency (heterodyne frequency) of a first partial beam with respect to the light phase or the light frequency of a second partial beam, having a superposition unit for superimposing the reflected measuring reference beam on the reflected measuring beam, having a beam decomposition and beam receiving unit for splitting the superimposed radiation into at least two beams having different wavelengths and for converting the radiation into electric signals, and having an analyzing unit in which the shape and/or distance of the rough surface is determinable on the basis of a phase difference of the electric signals. The radiation emitted by the beam generating unit is short-coherent in time and broadband.

Such interferometric measuring devices initially having two interferometers may be designed to have different interferometer types. The modulation interferometer may thus be designed as a Mach-Zehnder interferometer, while the measuring interferometer or the measuring probe may be designed as a compact interferometer, for example, a Mirau interferometer. The interferometric measuring devices share the feature that the path difference between two partial beams, established in the first interferometer, is equalized again by a short-coherent radiation source in the second measuring interferometer or measuring probe and the partial beams are thus brought to form interference. The path difference established by a delay element in published German patent document DE 198 08 273 may also be produced by partial arms of different lengths, through which the partial beams pass, as in a modulation interferometer featuring optical fibers depicted in published German patent document DE 198 08 273.

In order to improve the measuring accuracy of the interferometric measuring device, it is known to connect a reference interferometer to a second output of the modulation interferometer. It has an optical design like that of the measuring interferometer, i.e., it again equalizes the path difference between the two partial beams established in the modulation interferometer. However, the design of the reference interferometer differs from that of the measuring interferometer. The measuring accuracy of the interferometric measuring device may be improved by comparing the signals of the reference interferometer with those of the measuring interferometer.

The path difference to be established in the modulation interferometer depends on the design of the measuring interferometer or the measuring probe. After replacement of the measuring interferometer/measuring probe and/or a channel switch in the case of probes having multiple outputs, the path difference in the modulation interferometer must be adjusted accordingly. This is usually accomplished by a servo-motor by displacing optical components.

The path difference must be adjusted accordingly also in the reference interferometer. Here the path difference is usually adjusted by replacing a pre-adjusted unit or by using dual-channel reference probes having fixedly preset distances. The disadvantage here is that units adjusted to the measuring interferometer used must be available. The replacement of units is complicated.

An object of the present invention is to provide an interferometric measuring device which makes simple and highly accurate adjustment of the path differences established between partial beams of optically coupled interferometers possible.

It is furthermore an object of the present invention to provide a method therefor.

A BRIEF SUMMARY OF THE INVENTION

According to the present invention, the mechanical coupling between the reference interferometer and the modulation interferometer is provided with a backlash. Mechanical adjustments in the beam path of the modulation interferometer are transferred to the reference interferometer via the backlash in such a way that an appropriate adjustment of the beam path occurs here also. The path difference between partial beams established in the modulation interferometer and reset again in the reference interferometer is thus set via the adjustment. The backlash makes it possible to perform the adjustment of both interferometers in one operation. Only major adjustments are transferred to the reference interferometer by the backlash; minor displacements in the backlash distance provided in the backlash are not relayed. Minor changes in the optical path difference in the modulation interferometer may thus be performed without modifying the reference interferometer. A high degree of accuracy, comparable to a reference probe having a fixedly preset optical path difference, is thus achieved because positioning errors in the reference interferometer are avoided.

In an example embodiment of the present invention, the short-coherent radiation supplied to the modulation interferometer is split by a first beam splitter into two partial beams, the optical path of one partial beam being longer or shorter than that of the other partial beam in such a way that the optical path difference is greater than the coherence length of the short-coherent radiation, both partial beams being recombined upstream from a beam exit of the modulation interferometer and supplied to the reference interferometer which splits the radiation into two further partial beams, the optical path lengths of the two further partial beams being different in such a way that the optical path difference established in the modulation interferometer is equalized again, the optical path length for one partial beam in the modulation interferometer and in the reference interferometer being adjustable by using at least one movable optical component, and the movable optical components being mechanically coupled via the backlash. The position of the movable optical components defines the optical path difference in the interferometers. Due to the backlash, displacements of the movable optical components in the modulation interferometer that are smaller than a path segment defined by the backlash distance in the backlash result in no displacement of the movable optical components in the reference interferometer. Positioning errors for the movable optical component in the reference interferometer are thus avoided only in the case of major displacements of the movable optical components in the modulation interferometer, which also require an adjustment of the optical path difference in the reference interferometer, is the movable optical component in the reference interferometer also displaced.

If the backlash is formed by a coupling element and a driving element spaced at a backlash distance and if the coupling element is connected to a movable carrier for receiving one movable optical component and the driving element is designed for receiving the other movable optical component, the movable carrier having the optical component attached thereto may be moved within the backlash distance without the coupling element displacing the driving element and thus the other movable optical component. Only in the case of movements that are greater than the backlash distance does the coupling element contact the driving element, causing it to move.

A simple and accurately manufacturable design for the backlash results by designing the coupling element as a rod and by the driving element having a fork enclosing the rod in the direction of movement of the coupling element with a play or by designing the coupling element as a sphere and the driving element having a recess enclosing the sphere with a play. The play defines the backlash distance. In the case of a movement greater than the backlash distance, the rod or the sphere contacts the wall of the recess and thus entrains the driving element.

According to an example embodiment of the present invention, a measuring interferometer for measuring the shape and/or the roughness of a surface, in which the optical path difference established in the modulation interferometer is reset, is connected to a beam exit downstream from the modulation interferometer. The measuring interferometer specifies the path difference to be set in the modulation interferometer and thus also in the reference interferometer. The optical path differences in the modulation interferometer and, if major changes are needed, also in the reference interferometer via the backlash, may be adjusted to the measuring interferometer via the movable optical components, for example, after replacing the measuring interferometer or after a channel switch in the case of a measuring interferometer having a plurality of measuring probes.

The interference conditions for the short-coherent radiation at the output of the reference interferometer in the event of a change in the optical path difference in the modulation interferometer may be observed by the backlash implementing a mechanical coupling of the movable optical components in such a way that the movable optical component in the reference interferometer follows a movement of the movable optical component in the modulation interferometer with a backlash distance, the backlash distance being less than or equal to the coherence length of the short-coherent radiation and/or less than or equal to the optical path change in the event of a sensor replacement in the measuring interferometer. Based on the same path differences in the interferometers, the partial beams at the output of the reference interferometer continue to interfere in the event of changes in the path difference in the modulation interferometer that are less than or equal to the coherence length of the radiation used, even if the optical path difference in the reference interferometer is not changed. The movable optical component in the reference interferometer may therefore remain in its position in the event of such small changes in the path difference. The change in the path difference caused by a sensor replacement in the measuring interferometer is on the order of magnitude of the coherence length of the radiation, so that in the event of a corresponding channel switch, only the path difference in the modulation interferometer must be adjusted. Because positioning errors for the movable optical component of the reference interferometer are thus prevented, a very high degree of accuracy of the measuring device is achieved. Highly accurate measurements may thus be performed, for example, when using a measuring interferometer having a plurality of outputs and different optical paths are to be set for the different measuring points, the measuring value resulting from a combination of the distance values of the individual outputs. The latter is the case, for example, in the case of absolute measurements between shape elements having different inclinations on the measured object. If path difference changes greater than the coherence length are needed in the modulation interferometer, as occurs, for example, in the event of a replacement of the modulation interferometer, the path difference in the reference interferometer is also adjusted via the backlash.

Suitable adjustment of the path differences in the two interferometers is achieved by the plus or minus signs of the change in the optical paths in the two partial beams of the modulation interferometer and the reference interferometer being the same or different. Because the two partial beams are combined at the output of the modulation interferometer and split again into two partial beams at the beginning of the reference interferometer, a radiation component of both the delayed and undelayed partial beam from the modulation interferometer is present in both partial beams of the reference interferometer. A shortening of the optical path of one of the partial beams in the reference interferometer has therefore the same effect on the time sequence of the radiation components as a lengthening of the optical path in the other partial beam. The particular radiation components may thus be superimposed and brought to interference by changing the optical path lengths of the particular partial beams of the modulation and reference interferometers either in the same direction or in opposite directions.

A greater adjustment range of the optical path difference in the modulation interferometer while the path difference is left unchanged in the reference interferometer is achieved by placing a wavelength discriminating optical component in the area of a beam transition between the modulation interferometer and the reference interferometer or downstream from a beam exit of the reference interferometer. The wavelength discriminating component causes the coherence length of the radiation to increase, making a larger backlash distance possible. This is advantageous in particular in connection with measuring interferometers having a plurality of measuring outputs and being optically coupled to the modulation interferometer, because in the case of known measuring interferometers the change in the optical path difference caused by a channel switch in the measuring interferometer is usually somewhat greater than the original coherence length of the radiation emitted by the radiation source. If the coherence length is increased, an adjustment of the path difference in the modulation interferometer in the event of a channel switch, without adjusting the reference interferometer, is sufficient. In this case, the coherence length of the radiation must be only slightly increased, still making plenty of radiation available for the analysis of the interferometric measurement. This yields a good signal-to-noise ratio in the analyzer unit.

A sufficiently large increase in the coherence length of the radiation with low radiation losses is achieved by having a color filter, a diffraction grating system, a channel-separating fiber optic component, or a prism spectrometer as the wavelength discriminating optical component.

In an example embodiment of the present invention, the movable optical components are designed as a plane mirror, a triple mirror, or as coupling elements for light guide elements. These components are also used in current interferometric measuring devices of the above-described type without using the mechanical coupling according to the present invention and have been found satisfactory.

A more simple and more accurate equalization of the path differences may be achieved by providing a manually or power-driven linear drive for displacing the movable optical components, this drive engaging the movable carrier which supports the movable optical component of the modulation interferometer. The power drive may be part of an automatic measuring device in particular in which the path differences are equalized by an electronic control unit. Due to the fact that the linear drive engages the movable carrier which supports the movable optical component of the modulation interferometer, the optical path difference in the modulation interferometer is changed first in the event of a displacement. Only when the coupling element has traveled the backlash distance of the backlash due to the movement is the movable optical component of the reference interferometer also displaced via the driving element.

Accurate guidance and displacement of the movable optical components is achieved by a linear mounting of the movable carrier and the driving element and by providing an arresting device and/or a friction point for the driving element. The arresting device or friction point prevents the mounted, slightly movable driving element, which is not rigidly connected to the linear drive due to the backlash having the backlash distance, from accidentally moving. Furthermore, the friction point prevents the driving element from moving further within the backlash distance after a desired displacement due to its inertia.

A very broad field of application of the present invention for modulation interferometers and reference interferometers of different designs may be achieved by injecting the beam into the interferometric measuring device, optically connecting the modulation interferometer and the reference interferometer, and/or relaying the exiting beams via light guides or as a free beam.

According to the present invention, it is provided to change the optical path differences between the partial beams in the modulation interferometer and between the partial beams in the reference interferometer via movable optical components mechanically linked with the aid of a backlash, the movable optical component of the reference interferometer following a movement of the movable optical component of the modulation interferometer after traveling a backlash distance in the backlash. This makes it possible to change the path difference between the partial beams in the modulation interferometer in a range predefined by the backlash distance without displacing the movable optical component of the reference interferometer. Positioning errors in the reference interferometer are thus prevented, and a high degree of accuracy, comparable to that of a reference interferometer having fixedly set optical paths, is achieved. In the case of major changes in the optical path difference in the modulation interferometer, the movable optical component of the reference interferometer follows the movement of the optical component in the modulation interferometer, whereby the difference of the path differences between both interferometers remains constant except for the path segment predefined by the backlash distance.

The backlash distance of the backlash may be dimensioned in such a way that a displacement of the movable optical component of the modulation interferometer, accompanied by a change in the optical path difference that is less than or equal to the coherence length of the radiation used, does not cause the movable optical component of the reference interferometer to be displaced, and a displacement of the movable optical component of the modulation interferometer accompanied by a change of the optical path difference which is greater than the coherence length of the radiation causes the movable optical component of the reference interferometer to be displaced via the backlash in the same or the opposite direction. The path differences of the two interferometers thus remain the same within the coherence length of the radiation used, so that the partial beams may interfere at the output of the reference interferometer even after a change in the optical path differences.

In the case of a displacement of both movable optical components, the exact position of the movable optical component of the reference interferometer is set first, and then the movable optical component of the modulation interferometer is accurately positioned via a movement in the direction opposite to that of the original movement. The path differences in the modulation interferometer and the reference interferometer may thus be adjusted accurately to one another. When the measuring device is accurately adjusted, the backlash is subsequently set in its mid-position in such a way that the backlash distances for the two possible directions of movement match as closely as possible. The movable optical component of the modulation interferometer may return to the mid-position of the backlash automatically, an appropriate control unit being aware of and taking into account the extension of the backlash distance.

Accurate positioning of the movable optical component of the modulation interferometer is made possible by measuring the path of a displacement of the movable optical component in the modulation interferometer that is less than or equal to the coherence length of the short-coherent radiation on the basis of an interference measurement in the reference interferometer. No additional path measurement needs then to be performed in the modulation interferometer, resulting in considerable cost savings. In the case of greater displacements, the movable optical component of the reference interferometer is also displaced, making the above-described interferometric path measurement no longer possible.

DETAILED DESCRIPTION OF THE INVENTION

Figure 1:
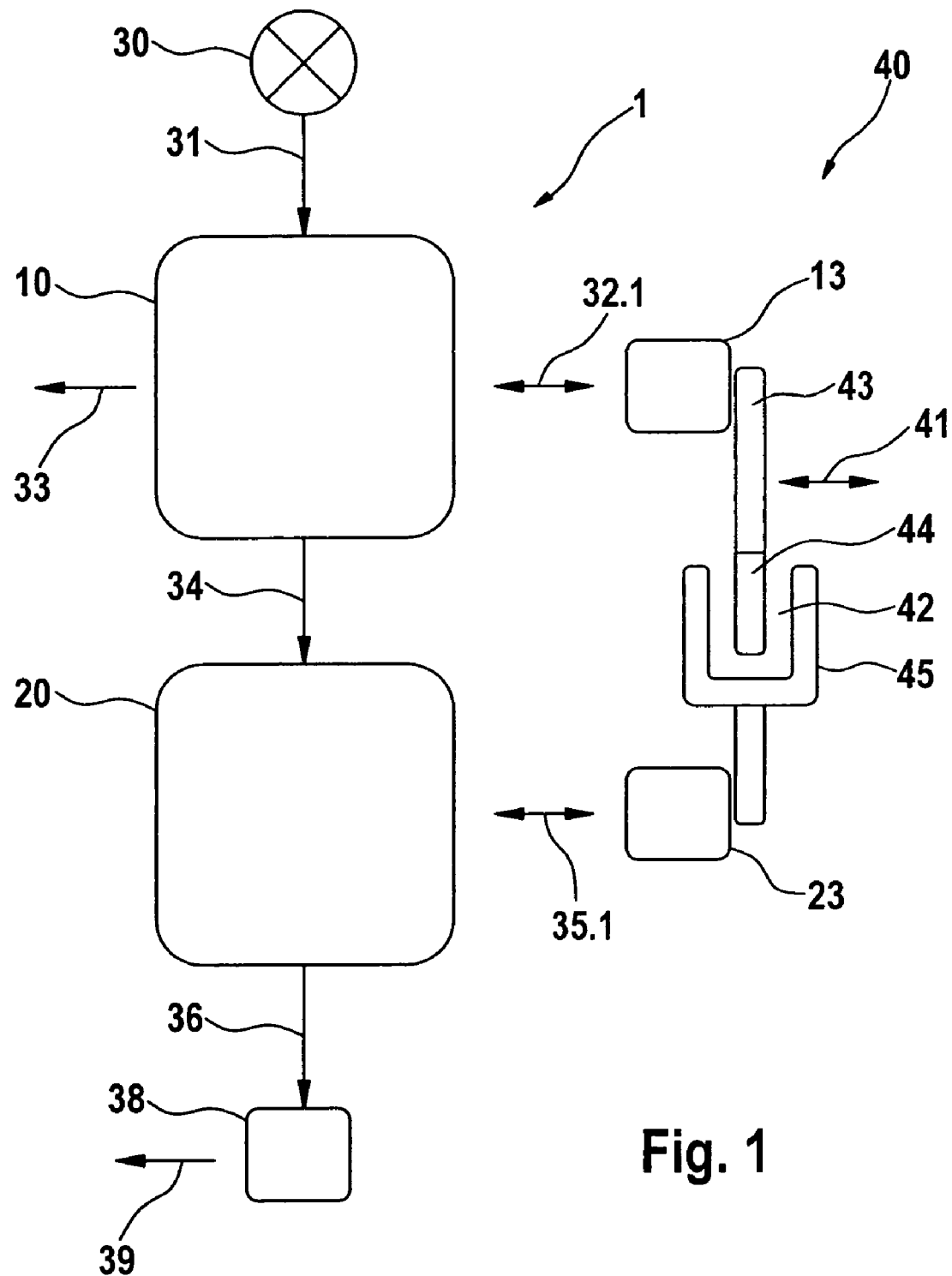
FIG. 1 schematically shows an interferometric measuring device having movable optical components, mechanically coupled via a backlash, of two interferometers.

FIG. 1 schematically shows an interferometric measuring device 1 having a short-coherent radiation source 30, a modulation interferometer 10, and a reference interferometer 20 connected downstream from modulation interferometer 10. Interferometric measuring device 1 is a white-light interferometer or a heterodyne interferometer. Short-coherent radiation 31 of radiation source 30 is supplied to modulation interferometer 10, relayed via a beam transition 34 to reference interferometer 20 and from there supplied to a wavelength discriminating component 38 downstream from a beam exit 36, after which the radiation leaves the system at a reference beam exit 39.

In addition to beam transition 34 to reference interferometer 20, modulation interferometer 10 provides a beam exit 33 for the optical coupling of a measuring interferometer (not depicted).

A movable optical component 13, 23 is associated with each of modulation interferometer 10 and reference interferometer 20. These are integral components of the particular interferometer, but are depicted separately for making the schematic illustration of the present invention clearer. Movable optical components 13, 23 are mechanically coupled via a backlash 40, which is formed by a carrier 43 having a coupling element 44 and a driving element 45. Movable optical component 13 of modulation interferometer 10 is mounted on movable carrier 43, which turns into rod-shaped coupling element 44 at its section opposite movable optical component 13. Coupling element 44 engages fork-shaped driving element 45 spaced by backlash distance 42. On its side facing away from coupling element 44, driving element 45 carries movable optical component 23 of reference interferometer 20.

In modulation interferometer 10 the supplied short-coherent radiation 31 is split into two partial beams (not depicted), one partial beam 32.1 being supplied to movable optical component 13. Movable optical component 13 is designed as a beam deflector for partial beam 32.1. Partial beam 32.1 returned from movable optical component 13 is superimposed (not depicted) on the partial beam (not depicted) in modulation interferometer 10 and supplied to beam transition 34 to reference interferometer 20. In reference interferometer 20 the radiation supplied via beam transition 34 is split into two partial beams (not depicted), one partial beam 35.1 being supplied to movable optical component 23, which is also designed as a beam deflector. The partial beams are then superimposed again following movable optical component 23 in reference interferometer 20 and supplied to beam exit 36.

A movement of movable carrier 43 according to a direction of movement 41 represented by an arrow initially results in a similar movement of movable optical component 13 of modulation interferometer 10. The optical path length for first partial beam 32.1 of modulation interferometer 10 and thus an optical path difference between the partial beams is thus modified.

In the event of a movement of movable carrier 43 that is greater than the distance between coupling element 44 and fork-shaped driving element 45 defined by backlash distance 42, coupling element 44 contacts driving element 45, causing it and optical component 23 of reference interferometer 20 connected thereto to move. This also modifies the optical path length for partial beam 35.1 and the optical path difference between the partial beams of the reference interferometer.

Small displacements of movable carrier 43 therefore result only in a change in the optical path difference between the partial beams in modulation interferometer 10, while displacements of movable carrier 43 that are greater than the path segment defined by backlash distance 42 also result in a change in the optical path difference between the partial beams in reference interferometer 20.

When put in service, the optical path difference established in modulation interferometer 10 is reset in reference interferometer 20, so that the partial beams at the output of reference interferometer 20 are able to interfere. For this purpose, the path differences in modulation interferometer 10 and reference interferometer 20 must be the same within the coherence length of radiation 31. Furthermore, a displacement of movable optical component 13 of modulation interferometer 10 that causes a change in the optical path difference of less than or equal to the coherence length of radiation 31 enables the formation of interference at the output of reference interferometer 20. In the event of a displacement of movable optical component 13 which causes a change in the optical path difference in modulation interferometer 10 that is greater than the coherence length, the optical path difference in reference interferometer 20 must also be adjusted accordingly. Backlash distance 42 is designed in such a way that in the specific embodiment of the present invention depicted here it is equal to one-half of the coherence length of the radiation. If coupling element 44 is shifted from its mid-position over the entire backlash distance 42 to contact driving element 45, the path difference in modulation interferometer 10 changes by the coherence length of the radiation because partial beam 32.1 travels the distance to optical component 13 and back, which also meets the interference condition at the output of reference interferometer 20 in the case of an unchanged optical path difference in reference interferometer 20. Because movable optical component 23 of reference interferometer 20 remains in its original position and is not displaced, positioning errors are avoided. A very high degree of accuracy of interferometric measuring device 1 is thus achieved.

In the event of a change in the optical path difference in modulation interferometer 10 that is greater than the coherence length of the radiation, which corresponds to a displacement of carrier 43 and of coupling element 44 that is greater than backlash distance 42, the optical path difference in reference interferometer 20 is also changed via driving element 45 and movable optical component 23. Because the movement of optical components 13, 23 is now uniform, the condition for interference formation at the output of reference interferometer 20 is observed.

In the event of a change in the path differences that is greater than the coherence length, it is advantageous if the desired optical path difference in reference interferometer 20 is adjusted first by appropriately positioning movable optical component 23. Subsequently the same optical path difference is set in modulation interferometer 10, for which purpose coupling element 44 is displaced again in the accurate adjustment into its mid-position between fork-shaped driving element 45. On the basis of this new positioning of movable optical components 13, 23, small changes in the path difference are possible within the coherence length of the radiation in modulation interferometer 10 without displacing movable optical component 23 of reference interferometer 20.

Wavelength discriminating component 38 is used to increase the coherence length of the radiation. A greater coherence length makes a greater change in the path difference established in modulation interferometer 10 possible without an adjustment of the path difference in reference interferometer 20 being necessary. Backlash distance 42 is accordingly designed for the increased coherence length.

Figure 2:
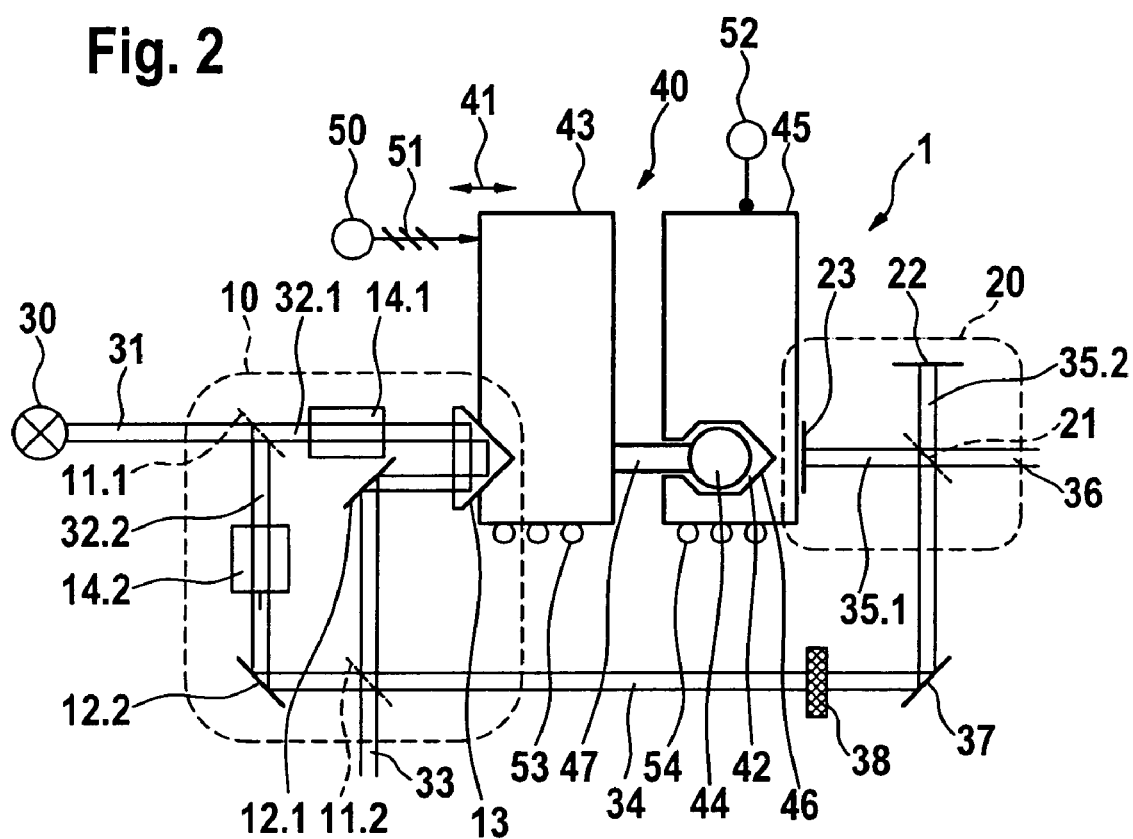
FIG. 2 shows an interferometric measuring device having movable optical components, mechanically coupled via a backlash, for a Mach-Zehnder modulation interferometer and a Michelson reference interferometer.

FIG. 2 shows interferometric measuring device 1 having movable optical components 13, 23, mechanically coupled via backlash 40, for a Mach-Zehnder modulation interferometer 10 and a Michelson reference interferometer 20. Also in this case, short-coherent radiation 31 of radiation source 30 which is coherent in space but short-coherent in time is supplied to modulation interferometer 10. Modulation interferometer 10 is designed as a Mach-Zehnder modulation interferometer having two beam splitters 11.1, 11.2, and two deflecting mirrors 12.1, 12.2. Incident short-coherent radiation 31 is split into two partial beams 32.1, 32.2 by first beam splitter 11.1. Two acousto-optical modulators 14.1, 14.2 are provided in the beam paths of the two partial beams 32.1, 32.2. A movable optical component 13 in the form of a triple prism, which reflects first partial beam 32.1 coming from acousto-optical modulator 14.1 to deflecting mirror 12.1 and from there to second beam splitter 11.2, is introduced in the beam path of first partial beam 32.1. Second partial beam 32.2 is reflected by deflecting mirror 12.2 downstream from acousto-optical modulator 14.2 to second beam splitter 11.2 in which both partial beams 32.1 and 32.2 are superimposed and supplied to beam exit 33 and to beam transition 34. In beam transition 34 between modulation interferometer 10 and reference interferometer 20, wavelength discriminating component 38 is provided in the form of a filter for increasing the coherence length of the radiation.

Downstream from wavelength discriminating component 38, the radiation is supplied to reference interferometer 20 via a deflecting mirror 37. Reference interferometer 20, as a Michelson interferometer, has a beam splitter 21, a fixed mirror 22, and movable optical component 23 in the form of a mirror. The radiation incident from mirror 37 is split into two partial beams 35.1, 35.2 by beam splitter 21. Partial beam 35.2 is reflected from fixed mirror 22, while partial beam 35.1 is reflected from movable optical component 23 to beam splitter 21 and from there they are supplied, superimposed, to beam exit 36.

Movable optical component 13 of modulation interferometer 10 is mounted on movable carrier 43, which is connected to a linear drive 51 having a motor 50. Motor 50 and linear drive 51 make a linear displacement of carrier 43 movably mounted on a bearing 53, and thus also a linear displacement of movable optical component 13, possible according to direction of movement 41 indicated by an arrow.

Spherical coupling element 44 is mounted on movable carrier 43 via connecting element 47, the spherical coupling element being positioned in a recess 46 of driving element 45. Recess 46 of driving element 45 encloses coupling element 44 spaced by backlash distance 42. Driving element 45 is linearly movably mounted on a bearing 54. Movable optical component 23 of reference interferometer 20 is mounted on the side of driving element 45 opposite to recess 46. Furthermore, an arresting device 52 is provided on driving element 45.

Due to a different optical path length in the beam paths of partial beams 32.1, 32.2 of modulation interferometer 10 and to the path difference between partial beams 32.1, 32.2 caused thereby, no interference occurs when partial beams 32.1, 32.2 are combined in second beam splitter 11.2 in the case of short-coherent radiation 31 used. The path difference may be varied by displacing movable carrier 43 and optical component 13 connected thereto.

A path difference between partial beams 35.1 and 35.2 that is approximately the same as in modulation interferometer 10 is generated in reference interferometer 20 via appropriately different optical path lengths in the beam paths of the two partial beams 35.1 and 35.2. The path difference established in modulation interferometer 10 is thus equalized and the two partial beams 35.1 and 35.2 may interfere after being combined in beam splitter 21.

The condition for forming interference is that the optical path differences in modulation interferometer 10 and reference interferometer 20 are the same within the coherence length of the radiation used. Backlash distance 42 of backlash 40 is designed in such a way that it allows a movement of carrier 43 and movable optical component 13 such that it causes a change in the optical path difference in modulation interferometer 10 that is less than or equal to the coherence length of the radiation without driving element 45 being also displaced. The path difference in modulation interferometer 10 may thus be modified by observing the interference condition without a modification occurring in the path difference in reference interferometer 10. The position of movable optical component 23 remains fixed; no position errors occur. Arresting device 52 prevents an unintended change in the position of driving element 45. Alternatively or additionally to arresting device 52, a friction point may also be provided, which prevents an unintended movement of driving element 45.

Only a movement of carrier 43 that is greater than backlash distance 42 results in coupling element 44 contacting the wall of recess 46 of driving element 45, also moving the driving element and movable optical component 23 of reference interferometer 20. The path differences are thus changed by the same amount in both interferometers, whereby the condition for interference is observed even in the event of changes in the optical path differences that are greater than the coherence length.

In the exemplary embodiment, the changes in the path segments and thus in the path differences in the two interferometers occur in opposite directions. This displacement of the optical path lengths in partial beams 32.1, 35.1 of the two interferometers in opposite directions corresponds, from the optical point of view, to a change in the optical path lengths in the same direction as occurs in the specific embodiment of the present invention depicted in FIG. 1. Because the two partial beams 32.1, 32.2 are combined at second beam splitter 11.2 of modulation interferometer 10 and split again into two partial beams 35.1, 35.2 at beam splitter 21 of reference interferometer 20, a radiation component of both the delayed and undelayed partial beam 32.1, 32.2 from modulation interferometer 10 is present in both partial beams 35.1, 35.2 of reference interferometer 20. Shortening of the optical path length of one of the two partial beams 35.1, 35.2 in reference interferometer 20 thus has the same effect on the time sequence of the radiation components as a lengthening of the optical path lengths in the other partial beam 35.1, 35.2. Thus the particular radiation components may be superimposed and partial beams 35.1, 35.2 brought to interference using a change in the optical path lengths in the particular partial beams 32.1, 35.1 of modulation interferometer 10 and reference interferometer 20 either in the same direction or in the opposite directions.

Such an interferometric measuring device 1 is advantageously designed in combination with a measuring interferometer not depicted here, which is optically coupled to beam exit 33 of modulation interferometer 10. This measuring interferometer may have a compact design and be connected to modulation interferometer 10 via optical fibers, for example, and thus perform measuring tasks on inaccessible measuring objects. An optical path difference between these partial beams is also introduced in this measuring interferometer, this path difference equalizing the path difference established in modulation interferometer 10 and thus resulting in interference. The path difference in such measuring interferometers is usually fixedly specified and varies from one measuring interferometer to another by an absolute value that is usually considerably greater than the coherence length of the radiation. Furthermore, measuring interferometers having a plurality of selectable outputs are known. A channel switch usually results here in a modified path difference, which is, however, considerably less than in the case of a switch of measuring interferometers. Using wavelength discriminating component 38 and the coherence length of the radiation thus increased, a change in the path difference in the measuring interferometer that is within the coherence length of the radiation is achieved. The path difference in modulation interferometer 10 may therefore be adjusted to a new path difference of the measuring interferometer due to a channel switch without a displacement of movable optical component 23 occurring via the backlash in reference interferometer 20. Positioning errors in reference interferometer 20 are thus prevented. In the event of a switch of measuring interferometers and the resulting change in the optical path difference greater than the coherence length of the radiation, a corresponding adjustment of the path difference in modulation interferometer 10 occurs by a displacement of optical component 13 and movable carrier 43 that is greater than backlash distance 42. Movable optical component 23 in reference interferometer 20 is also displaced thereby via backlash 40, and the optical path difference in reference interferometer 20 is set to the new measuring interferometer and the new path difference in modulation interferometer 10.

What is claimed is:

1. An interferometric measuring device, comprising:
    a short-coherent radiation source generating a short-coherent radiation beam; and
    a modulation interferometer and a downstream reference interferometer mechanically connected to the modulation interferometer;
    wherein the mechanical connection between the reference interferometer and the modulation interferometer is provided with a backlash.

2. The interferometric measuring device as recited in claim 1, wherein:
    the short-coherent radiation beam is supplied to the modulation interferometer and split into first and second partial beams by a first beam splitter within the modulation interferometer, and the optical path length of one of the first and second partial beams is different than the optical path length of the other of the first and second partial beams in such a way that the optical path difference of the first and second partial beams is greater than the coherence length of the short-coherent radiation;
    the first and second partial beams are recombined upstream from an exit of the modulation interferometer to form a recombined beam, the recombined beam being supplied to the reference interferometer and split into third and fourth partial beams within the reference interferometer, the optical path lengths of the third and fourth partial beams being different in such a way that the optical path difference between the first and second partial beams established in the modulation interferometer is equalized; and
    the optical path length of at least one of the first partial beam in the modulation interferometer and the third partial beam in the reference interferometer is adjustable by using at least one movable optical component mechanically coupled via the backlash.

3. The interferometric measuring device as recited in claim 2, wherein the backlash is formed by a coupling element and a driving element spaced at a specified backlash distance, the coupling element is connected to a movable carrier for accommodating a first movable optical component, and the driving element is configured for accommodating a second movable optical component.

4. The interferometric measuring device as recited in claim 3, wherein one of: (a) the coupling element is configured as a rod and the driving element has a fork enclosing the rod in the direction of movement of the coupling element, the fork having a clearance distance from the rod equal to the specified backlash distance; and (b) the coupling element is configured as a sphere and the driving element has a recess enclosing the sphere, the sphere having a clearance distance from the surface of recess equal to the specified backlash distance.

5. The interferometric measuring device as recited in claim 2, further comprising:
    a measuring interferometer for measuring at least one of a shape and a roughness of a surface, wherein the measuring interferometer is connected downstream from a beam exit area of the modulation interferometer, and wherein the optical path difference between the first and second partial beams established in the modulation interferometer is reset.

6. The interferometric measuring device as recited in claim 2, wherein two movable optical components are provided, and wherein the backlash effects a mechanical coupling of the movable optical components in such a way that a movable optical component in the reference interferometer follows a movement of a movable optical component in the modulation interferometer at the specified backlash distance, and wherein the specified backlash distance is at least one of: (a) not larger than the coherence length of the short-coherent radiation beam emitted by the short-coherent radiation source; and (b) not larger than an optical path change in the event of a sensor replacement in the measuring interferometer.

7. The interferometric measuring device as recited in claim 2, wherein the change in the optical path lengths in the first partial beam of the modulation interferometer and the third partial beam of the reference interferometer has the same algebraic sign.

8. The interferometric measuring device as recited in claim 2, further comprising:
    a wavelength-discriminating optical component situated one of: a) in a transition area between the modulation interferometer and the reference interferometer; and b) downstream from a beam exit area of the reference interferometer.

9. The interferometric measuring device as recited in claim 8, wherein the wavelength-discriminating optical component is one of: a color filter; a diffraction grating device; a channel-separating fiber-optic component; and a prism spectrometer.

10. The interferometric measuring device as recited in claim 2, wherein the at least one movable optical component is configured as one of: a plane mirror; triple mirror; and a coupling element for a light guide element.

11. The interferometric measuring device as recited in claim 3, further comprising:
a linear drive configured to displace the at least one movable optical component, wherein the linear drive engages the movable carrier accommodating the first movable optical component associated with the modulation interferometer.

12. The interferometric measuring device as recited in claim 3, wherein the movable carrier and the driving element are linearly supported, and wherein at least one of an arresting device and a friction point is provided for the driving element.

13. The interferometric measuring device as recited in claim 2, wherein at least one of the following is achieved by using an optical fiber: a) introduction of the short-coherent radiation beam into the modulation interferometer; b) an optical connection between the modulation interferometer and the reference interferometer; and c) transmission of beams exiting the reference interferometer.

14. A method for equalizing an optical path difference in an interferometric measuring device having a modulation interferometer and a downstream reference interferometer, comprising:
supplying a short-coherent radiation beam to the modulation interferometer;
splitting the short-coherent radiation beam into first and second partial beams by a first beam splitter within the modulation interferometer, wherein the optical path length of one of the first and second partial beams is different than the optical path length of the other of the first and second partial beams in such a way that the optical path difference of the first and second partial beams is greater than the coherence length of the short-coherent radiation;
recombining the first and second partial beams upstream from an exit of the modulation interferometer to form a recombined beam;
supplying the recombined beam to the reference interferometer;
splitting the recombined beam into third and fourth partial beams within the reference interferometer, the optical path lengths of the third and fourth partial beams being different in such a way that the optical path difference between the first and second partial beams established in the modulation interferometer is equalized; and
modifying at least one of: a) the optical path difference between the first and second partial beams in the modulation interferometer; and b) the optical path difference between the third and fourth partial beams in the reference interferometer, wherein the modification is achieved via at least two movable optical component mechanically coupled via a backlash, wherein first movable optical component associated with the reference interferometer follows a movement of second movable optical component associated with the modulation interferometer after passing through a specified backlash distance within the backlash.

15. The method as recited in claim 14, wherein:
a) if a displacement of the first movable optical component associated with the modulation interferometer occurs, accompanied by a change in the optical path difference between the first and second partial beams not larger than the coherence length of the short-coherent radiation beam, the second movable optical component associated with the reference interferometer is not displaced; and
b) if a displacement of the first movable optical component associated with the modulation interferometer occurs, accompanied by a change in the optical path difference between the first and second partial beams greater than the coherence length of the short-coherent radiation beam, the second movable optical component associated with the reference interferometer is displaced via the backlash.

16. The method as recited in claim 14, wherein, if a displacement of both the first and second movable optical components occurs, the position of the second movable optical component associated with the reference interferometer is set first, and then the position of the first movable optical component associated with the modulation interferometer is set via a movement in a direction opposite to that of the original movement.

17. The method as recited in claim 14, further comprising:
performing a displacement measurement of a displacement of the first movable optical component associated with the modulation interferometer no larger than the coherence length of the short-coherent radiation beam, wherein the displacement measurement is performed using an interference measurement in the reference interferometer.

* * * * *